Patented July 28, 1953

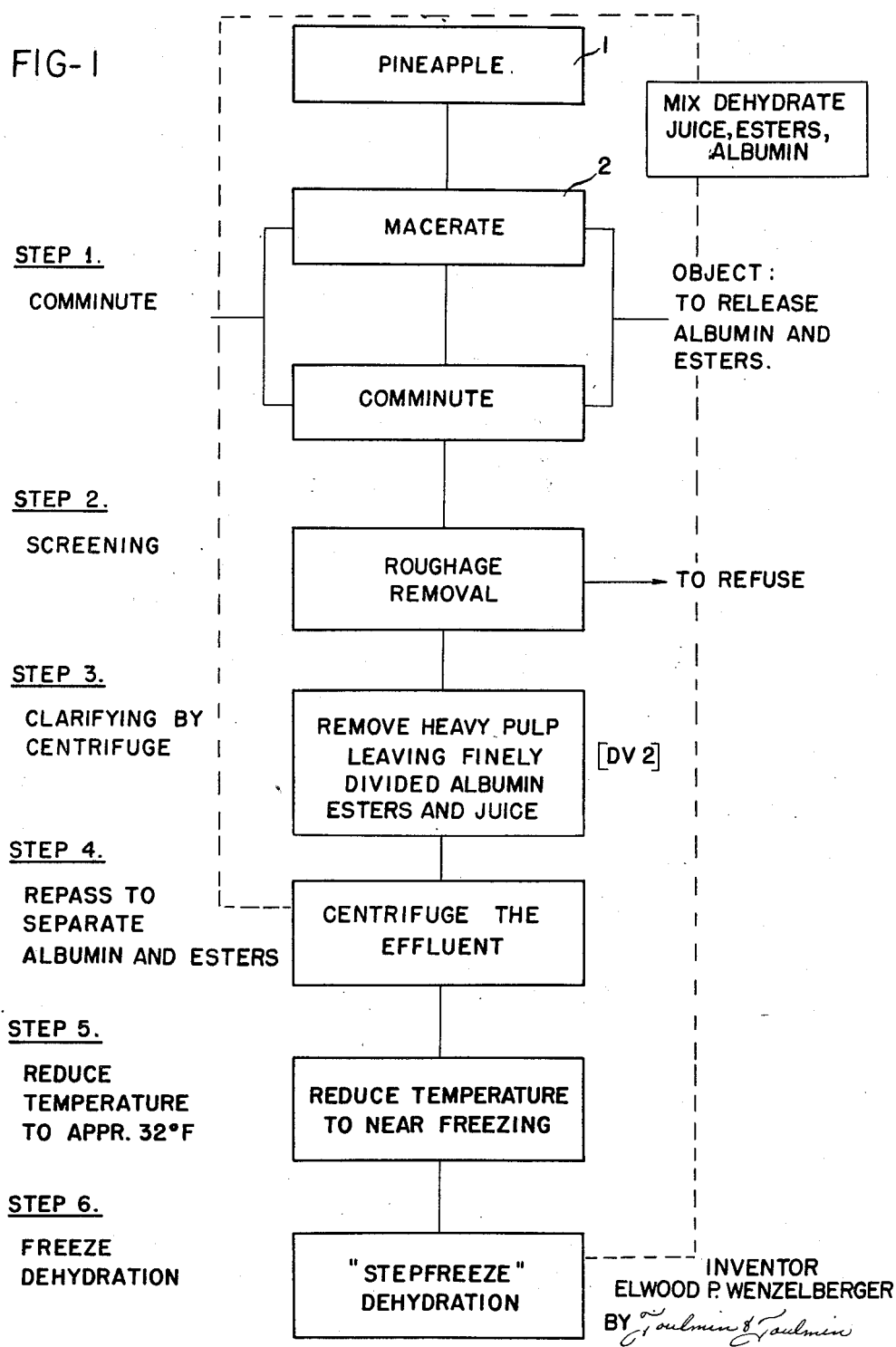

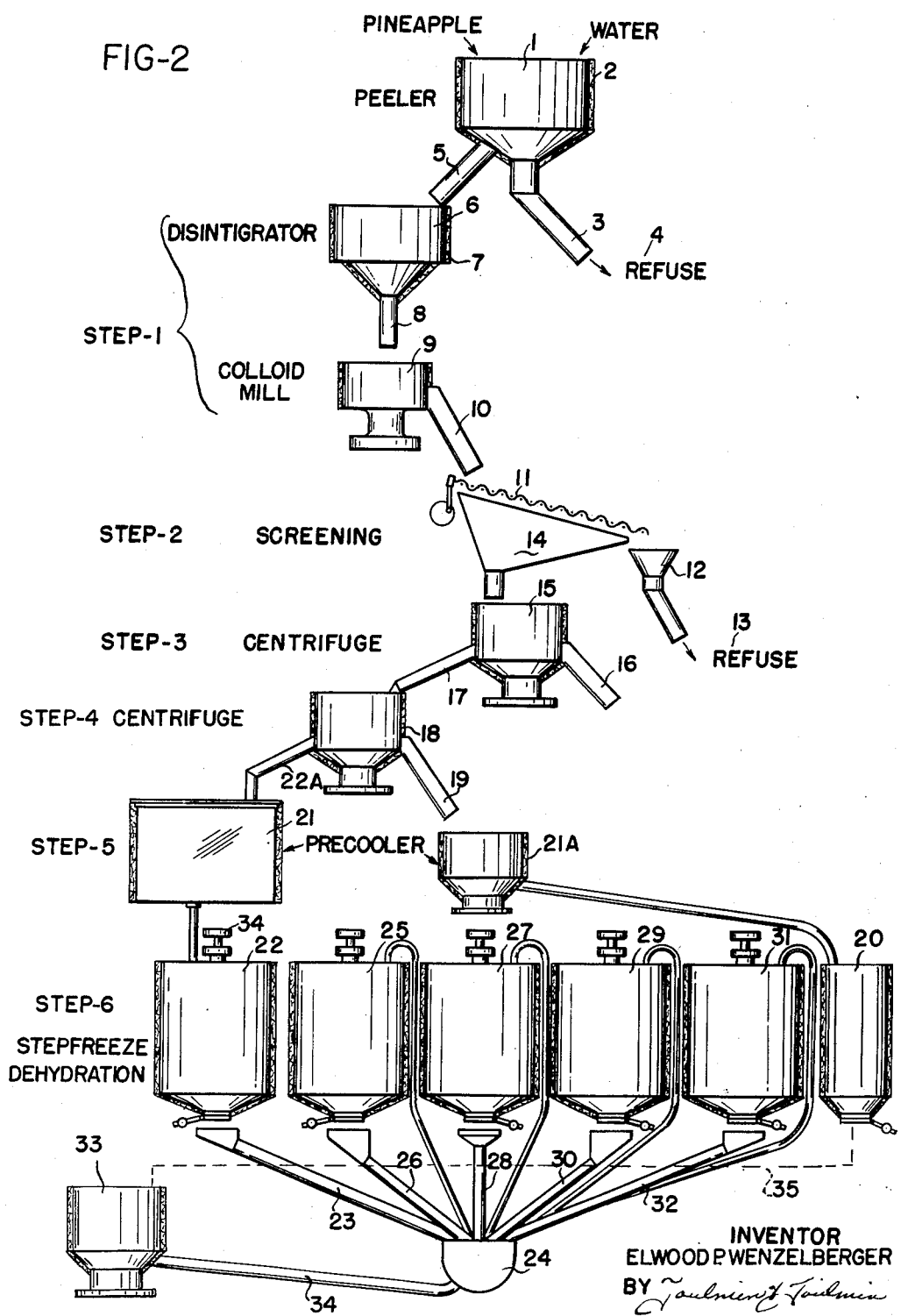

2,647,059

UNITED STATES PATENT OFFICE 2,647,059

PROCESS FOR DEHYDRATION OF
PINEAPPLE JUICE

Elwood P. Wenzelberger, Dayton, Ohio, assignor to The Commonwealth Engineering Company of Ohio, Dayton, Ohio, a corporation of Delaware Application September 15, 1951, Serial No. 246,810

4 Claims. (Cl. 99—206)

1

My invention relates to dehydration of pineapple juice.

The object of this invention is to provide a process and apparatus for producing dehydrated pineapple juice and similar juices having similar characteristics and chemical content.

It is the object of the invention to maintain the juice from the time that the pineapple is peeled until the final juice is canned under refrigeration, and where possible, under controlled atmospheric conditions so as to prevent any change in taste, and particularly, any loss of esters which account for the flavor in pineapple juice. These esters are difficult to capture and are very volatile. It has been found that to concentrate pineapple juice and retain its natural flavor these esters must be retained in the juice. They are largely combined, it is believed, with albumin which is in the fine, meaty portion of the pineapple and which lies within the fiber. I believe it desirable to carry out this operation at room temperature, and preferably at below room temperature, so there will be no volatilizing of the esters or spoiling of the albumin.

A further object of this invention is to remove the pulp by stages and to dehydrate the juice from which the albumin and esters have been removed and from which the coarse and fine fiber has been removed after the juice and fiber have been comminuted and disintegrated.

It is a further object to remove the heavy pulp, so comminuted, and leaving in it the finely divided albumin and esters and then repassing to separate the albumin and esters with the fine pulp from the heavy pulp. Thereafter the temperature of the albumin should be reduced as low as possible, close to freezing. It is the final effluent which is free of albumin and esters and free of all coarse and fine pulp that is dehydrated in my "Stepfreeze" process at varying degrees of temperature by stages as fully set forth in my Patents Nos. 2,542,523, dated May 15, 1951; 2,559,204, dated July 3, 1951, and 2,559,205, dated July 3, 1951.

The effectiveness of the forming of crystal ice from the water in the juice is vastly improved because the continuous cooling at each stage has precooled the juice and there is no pulp or albumin or esters to be considered in freezing. This facilitates the ice crystal formation and reduces the loss of any albumin during centrifuging.

It is an object, upon accomplishment of dehydration, to then add back the albumin and esters to the dehydrated juice. As these albumins and esters are maintained at low temperature, this can be done immediately with no risk of

2 spoiling. There is no delay in prompt packing.

In order to accomplish the foregoing, I completely macerate and pulverize the pineapple in order to thoroughly release the albumin and esters. This disintegration and final comminuting can be followed by a rough screening, which in turn is followed by centrifuging the heavy pulp and then centrifuging to remove the fine pulp and the albumin and esters. The dehydration treatment of the pineapple juice is carried out while maintaining the temperature at all stages between about 40° to 0° F. in order to retain all the delicate volatile esters which are present in the pineapple juice.

Referring to the drawings, Figure 1 is a flow sheet showing the steps of this process.

Referring to Figure 2 in detail, pineapples are introduced into a peeler designated 1, the jacket of which is refrigerated at 2. This peeler removes the outer covering of the pineapple and discharges this material under a stream of water through the pipe 3 as refuse 4. The pineapple without its outer covering is discharged through the pipe 5 into the disintegrator 6. The peeler 1 may be any conventional type preferably of the type set forth in application Serial No. 107,986, filed August 1, 1949, by Herbert M. Riggle and Walter B. Rose, allowed October 15, 1952, as Patent Number 2,619,139. The disintegrator 6 is also provided with a refrigeration jacket 7. Upon the accomplishment of the disintegration into pulp and juice in the disintegrator 6, this combined pulp and juice passes through the pipe 8 into the refrigerated colloidal mills 9 where the material is reduced to colloidal fineness.

This material is then discharged through the chute 10 to the screen 11 which discharges the coarser particles into the pipe 12 to discharge the refuse 13. The finer particles, including the albumin and esters and very fine fibers, pass into the hopper 14 and thence into the refrigerated centrifuge 15 where the heavy pulp is discharged through the passageway 16 and the juice, albumin and esters and such pulp as may be entrained moves through the pipe 17 into the refrigerant centrifuge 18, whence the albumin and esters pass through the pipe 19 to the pre-cooler 21a, whence they go to the holding tank at 20. Some small amount of juice, very fine pulp containing the esters and albumin is carried to tank 20.

The juice, free of albumin and the entrained esters in the albumin, and all pulp then passes to a pre-cooling tank at 21 through the pipe 22a. This tank is also refrigerated and maintains the temperature at approximately 28 degrees F. The juice from the pre-cooler then proceeds to the tank 22 and after formation of ice crystals passes through the pipe 23 to the centrifuge at 24 and then is pumped back to the next tank 25, where at a lower temperature the process is repeated and the juice and ice crystals are discharged through the pipe 26 to the centrifuge 24. The juice is then returned to the tank 27 whence it is discharged after formation of ice crystals at a still lower temperature and passes into the centrifuge from the pipe 28. The ice crystals are again removed and the juice is returned to tank 29 where a still lower temperature forms ice crystals from the free water.

The concentrate and ice crystals are returned through the pipe 30 to the centrifuge 24 where the ice crystals are removed. The juice, so concentrated, is returned to the tank 31 whence it is delivered, after reduction of temperature, through the pipe 32 to the centrifuge 24. The centrifuge separates the ice crystals and the completed dehydrated juice is then delivered to the refrigerated tank 33 by pipe 34 where the contents of albumin and esters of refrigerated tank 20 are delivered by pipe 35 and mixed. The dehydrated pineapple juice is then packed in the usual manner.

The details of this dehydration are shown in Patents Nos. 2,552,523, dated May 15, 1951; 2,559,204, dated July 3, 1951, and 2,559,205, dated July 3, 1951. The difference in temperature between tanks 22, 25, 27, 29 and 31 is approximately 5 degrees and the difference in the temperature of the contents of the tanks and the refrigerant is approximately 5 degrees. As pointed out in the aforementioned U. S. Patent No. 2,559,205, each successive stage of freezing is maintained approximately 5° below the ice forming temperature of the solution, the refrigerant being controlled for each tank at a differential of 5° lower than that of the succeeding tank. A typical set of examples for five tanks such as tanks 22, 25, 27, 29 and 31 are illustrated in Examples I and II of said patent. During the dehydration the stirrers 34 constantly agitate the contents of the tanks. These details are set forth elsewhere.

It will be understood that I desire to comprehend in the hereinafter appended claims the necessary variations in the process of my invention and intend to include within the scope such modifications that come within the scope of this invention as discussed in this application.

I claim:

1. In a method of dehydrating pineapple juice the improvement which consists in maintaining the temperature continuously and during all treatment steps between approximately 40° to 0° F., and comprising the step (a) of disintegrating the pineapple solids in the presence of pineapple juice; the step (b) of removing the pulp roughage; the step (c) of separating the heavy pulp, left after removing the roughage, from the albumin, esters and juice; the step (d) of centrifuging the esters and albumin with any finely divided pulp from the juice; and the step (e) of dehydrating by freezing through successively lower temperatures to remove the water from the juice in the form of ice crystals.

2. In a method of dehydrating pineapple juice the improvement which consists in maintaining the temperature continuously and during all treatment steps between approximately 40° to 0° F., and comprising: the step (a) of disintegrating the pineapple solids in the presence of pineapple juice; the step (b) of removing the pulp roughage; the step (c) of separating the heavy pulp, left after removing the roughage, from the albumin, esters and juice; the step (d) of centrifuging the esters and albumin with any finely divided pulp from the juice; the step (e) of dehydrating by freezing through successively lower temperatures to remove the water from the juice in the form of ice crystals; and the step (f) of reinforcing the dehydrated juice with the extracted esters and albumin.

3. In a method of preparing pineapple juice concentrate the improvement which consists in step (a) of peeling the pineapple at a low temperature; the step (b) of disintegrating the remaining pulp in the presence of juice at below room temperature; the step (c) of reducing the solids in the presence of juice to colloidal sizes at below room temperature; the step (d) of removing the roughage; the step (e) of centrifuging at said low temperature a major portion of the solids leaving the juice, esters and albumin and such portion of the solids as support and incorporate the albumin and esters; the step (f) of again centrifuging at said low temperature to separate the juice from the entrained solids carrying the albumin and esters, said temperature being on the order of between about 0° and 40° F.

4. In a method of producing pineapple juice concentrate while maintaining the temperature continuously during the treatment steps between about 40° to 0° F., and which comprises the step (a) of reducing the pulp to a finely divided state; the step (b) of classifying the pulp into heavy pulp and lighter pulp carrying the albumin and esters; the step (c) of successively separating first the pulp from the juice and secondly the lighter pulp carrying the esters and albumin from the juice, and during each stage the said steps (d) of maintaining the operations at reduced temperature and from approximately 40° F. to 0° F.; and the subsequent step (e) of dehydrating the juice by step-by-step refrigeration stages to approximately 0° F. temperature and removing the water in the form of ice crystals at each stage; and the step (f) of mixing the dehydrated juice at reduced temperatures of approximately 0° F. with the albumin and esters.

ELWOOD P. WENZELBERGER.

References Cited in the file of this patent

UNITED STATES PATENTS

| Number | Name | Date |
|---|---|---|
| 1,189,127 | Kellogg | June 27, 1916 |
| 1,295,943 | Welch | Mar. 4, 1919 |
| 2,115,815 | Johnson | May 3, 1938 |
| 2,286,354 | Fitzsimmons | June 16, 1942 |
| 2,374,456 | Ravndal et al. | Apr. 24, 1945 |
| 2,552,523 | Wenzelberger | May 15, 1951 |
| 2,558,799 | Thomas | July 3, 1951 |